(12) United States Patent
Castine

(10) Patent No.: US 9,160,615 B2
(45) Date of Patent: Oct. 13, 2015

(54) DEVICE AND METHOD FOR REMOTE COMPUTER OPERATION

(71) Applicant: Nicholas J. Castine, Williamsville, NY (US)

(72) Inventor: Nicholas J. Castine, Williamsville, NY (US)

(73) Assignee: Corvo Technologies LLC, Williamsville, NY (US)

( * ) Notice: Subject to any disclaimer, the term of this patent is extended or adjusted under 35 U.S.C. 154(b) by 0 days.

(21) Appl. No.: 14/176,168

(22) Filed: Feb. 10, 2014

(65) Prior Publication Data

US 2015/0229509 A1 Aug. 13, 2015

Related U.S. Application Data

(63) Continuation of application No. PCT/US2012/050481, filed on Aug. 10, 2012.

(60) Provisional application No. 61/521,788, filed on Aug. 10, 2011.

(51) Int. Cl.
*G06F 15/16* (2006.01)
*H04L 12/24* (2006.01)
*G06F 12/00* (2006.01)

(52) U.S. Cl.
CPC .................................. *H04L 41/046* (2013.01)

(58) Field of Classification Search
CPC ........... G01R 31/343; G01R 31/31705; G01R 31/318544; G01R 31/318555; G01R 31/318591; G06F 21/577; G06F 8/60; G06F 11/2294; G06F 11/3664; G06F 8/61; G06F 8/30; G06F 11/261; G06F 11/3438; G06F 11/34
USPC .......... 709/217–218, 203, 223–229, 231–250
See application file for complete search history.

(56) References Cited

U.S. PATENT DOCUMENTS

| | | | |
|---|---|---|---|
| 6,145,001 A * | 11/2000 | Scholl et al. ................... | 709/223 |
| 6,263,365 B1 * | 7/2001 | Scherpbier ..................... | 709/218 |
| 7,240,111 B2 | 7/2007 | VanHarlingen et al. | |
| 7,330,919 B2 * | 2/2008 | Zhang et al. .................... | 710/72 |
| 7,676,035 B2 | 3/2010 | Werth et al. | |
| 7,796,982 B2 | 9/2010 | Mohanty | |
| 7,970,859 B2 | 6/2011 | Weinstock et al. | |
| 8,214,888 B2 * | 7/2012 | Noe et al. ........................... | 726/9 |
| 8,639,491 B2 * | 1/2014 | Mann et al. ..................... | 703/23 |
| 2003/0163484 A1 | 8/2003 | Salmonsen et al. | |
| 2006/0142991 A1 * | 6/2006 | Sajwani et al. ................. | 703/25 |
| 2007/0005867 A1 * | 1/2007 | Diamant ........................ | 710/306 |
| 2007/0018844 A1 | 1/2007 | Sutardja | |
| 2008/0005222 A1 * | 1/2008 | Lambert et al. ............... | 709/203 |
| 2008/0082705 A1 | 4/2008 | Shirley | |
| 2009/0018890 A1 | 1/2009 | Werth et al. | |
| 2009/0080856 A1 | 3/2009 | Day et al. | |
| 2009/0117777 A1 | 5/2009 | Chen | |
| 2009/0233643 A1 | 9/2009 | Nishimura | |
| 2010/0138270 A1 | 6/2010 | Werth et al. | |
| 2011/0022641 A1 | 1/2011 | Werth et al. | |
| 2011/0022653 A1 | 1/2011 | Werth et al. | |
| 2011/0029658 A1 | 2/2011 | Werth et al. | |
| 2011/0161721 A1 | 6/2011 | Fulginiti | |
| 2013/0238820 A1 * | 9/2013 | Yang ............................... | 710/19 |

* cited by examiner

*Primary Examiner* — Zarni Maung
(74) *Attorney, Agent, or Firm* — Phillips Lytle LLP

(57) ABSTRACT

A network device having a processor, an interface for emulating a human interface device, a video input, a data storage for storing data from a target device or transferring data to the target device, a first network interface, wherein the network device is configured to provide control of a target device, through the interface for emulating a human interface device.

15 Claims, 4 Drawing Sheets

DEVICE AND METHOD FOR REMOTE COMPUTER OPERATION

RELATED APPLICATIONS

This application is a national phase application of PCT/US12/50481 which was filed on Aug. 10, 2012, and claims priority from provisional application No. 61/521,788 which was filed on Aug. 10, 2011, both of which are hereby incorporated by reference in their entirety.

TECHNICAL FIELD

The technical field relates to remote control of a computer system.

BACKGROUND ART

Remote control devices and methods are generally known. Keyboard-Video-Mouse ("KVM") switches provide a way to provide a target computer system emulated keyboard and mouse signals while receiving a video signal from the target computer system.

BRIEF SUMMARY OF THE INVENTION

With parenthetical reference to the corresponding parts, portions or surfaces of the disclosed embodiment, merely for the purpose of illustration and not by way of limitation, a network device (130) is provided comprising: a processor (160), an interface for emulating a human interface device (140), a video input (134), a data storage (150) for storing data from a target device (110) or transferring data to said target device, a first network interface (170), wherein said network device is configured to provide control of the target device through the interface for emulating a human interface device. The first network interface may be connected to a network 120.

In another aspect, a network device (230) is provided comprising: a processor (260), an interface for emulating a human interface device (240), a video input (234), a data storage (250) for storing data from a target device (210) or transferring data to said target device, a first network interface (270), wherein said network device is configured to provide control of the target device through the interface for emulating a human interface device. The first network interface may be connected to a network (220).

The interface for emulating a human interface device may include emulation of a keyboard or pointing device. The pointing device may be a mouse, a virtual mouse, a touchpad, a trackpoint, or other similar device. The interface for emulating a human interface device may include emulation for a virtual device or for emulation of a physical device at another location. The interface for emulating a human interface device may include a USB interface, and the USB interface may be capable of acting as either a USB host or USB peripheral. The USB interface may be a USB on the go interface. The interface for emulating a human interface device may include emulation of a hard drive and/or disk drive.

The first network interface may be capable of connecting to the network without manual configuration. The network interface may be a wireless interface. The wireless interface may be a mobile data interface, and/or may be a 3G, 4G, LTE, EDGE, GPRS, EV-DO, UMTS, or Wi-Fi interface.

The network device may be configured to relay human interface device data received from the network interface over the interface for emulating a human interface device.

The data storage may be configured to act as a peripheral storage device for the target device. The data storage may be a flash solid state drive, a hard disk drive, or may be an external data storage interface such as an SD card slot, usb port, or SATA port. The data storage device may include data and/or software to be transferred to the target device. The software on the data storage device may be for installation on the target device, and/or may be for providing network based control of the target device by a remote user.

The network device may include a second network interface (280), and the second network interface may be for connecting to the target device. The second network interface may be an Ethernet interface, a Wi-Fi hotpot, or other similar interface.

The network device may further include a speaker (281), display (282), touchpad (283), and/or touchscreen (284). The network device may further include a video camera (285), and/or a physical optical disk drive. The network device further including a battery (286) and/or a power converter. The network device may contain indicia for identifying the interface for emulating a human interface device. Such indicia may include color coding of cables, ports, and/or adapters of the interface for emulating a human interface device.

In another aspect, provided is a method of providing (300) remote support comprising the steps of: providing (303) a network device comprising a processor, an interface for emulating a human interface device, a video input, a data storage for storing data from a target device or transferring data to the target device, a first network interface, in which the network device is configured to provide control of the target device, through the interface for emulating a human interface device; connecting (306) the network device to a target device having a video output at a first location; connecting (309) the network device to a computer network; linking (312) said network device to a control interface at a second location; relaying (315) video data from the target device video output to the control interface; and relaying (318) human interface device commands from the control interface to the target device.

In another aspect, provided is a method of providing (400) remote support comprising the steps of: accepting (403) a service request from a user with a target device at a first location; transporting (406) a network device from a second location to the first location for connection to the target device (409), said network device including a processor, an interface for emulating a human interface device, a video input, a data storage for storing data from a target device or transferring data to said target device, and a first network interface; providing (412) a server computer; accepting (415) a connection from the network device linking said network device to a control interface at a second location; relaying (419) video from said target device video output to said control interface; and relaying (421) human interface device commands from said control interface to said target device. The network device may include a wireless data modem. The network device may include a data storage. The method of providing remote support may include the step of copying data from the target device to the data storage and/or copying data from the data storage to the target device.

The step of transporting the network device may include mailing (407) the network device with a postal service. The step of transporting the network device may include providing return postage and/or a return postage mechanism.

The method of providing remote support may include the step of providing (408) a wireless data network connection to the network device.

The method of providing remote support may include the steps of sending (416) a message from the network device to the server computer; receiving (417) the message at the server computer; determining (418) routing information from the message at the server computer; and using (430) the routing information in order to facilitate a network connection between the control interface and the network device.

The method of providing remote support may include the step of receiving or retrieving (423) the network device upon completion of a service. The method of providing remote support may include the step of mounting (420) an emulated local drive on the target device.

The method of providing remote support may include the step of altering BIOS on the target device. The method of providing remote support may include the step of booting the target device to a provided operating system.

The first location may be a customer home and/or a commercial business location. The second location may be a regional warehouse.

DESCRIPTION OF THE PREFERRED EMBODIMENTS

Figure 1:
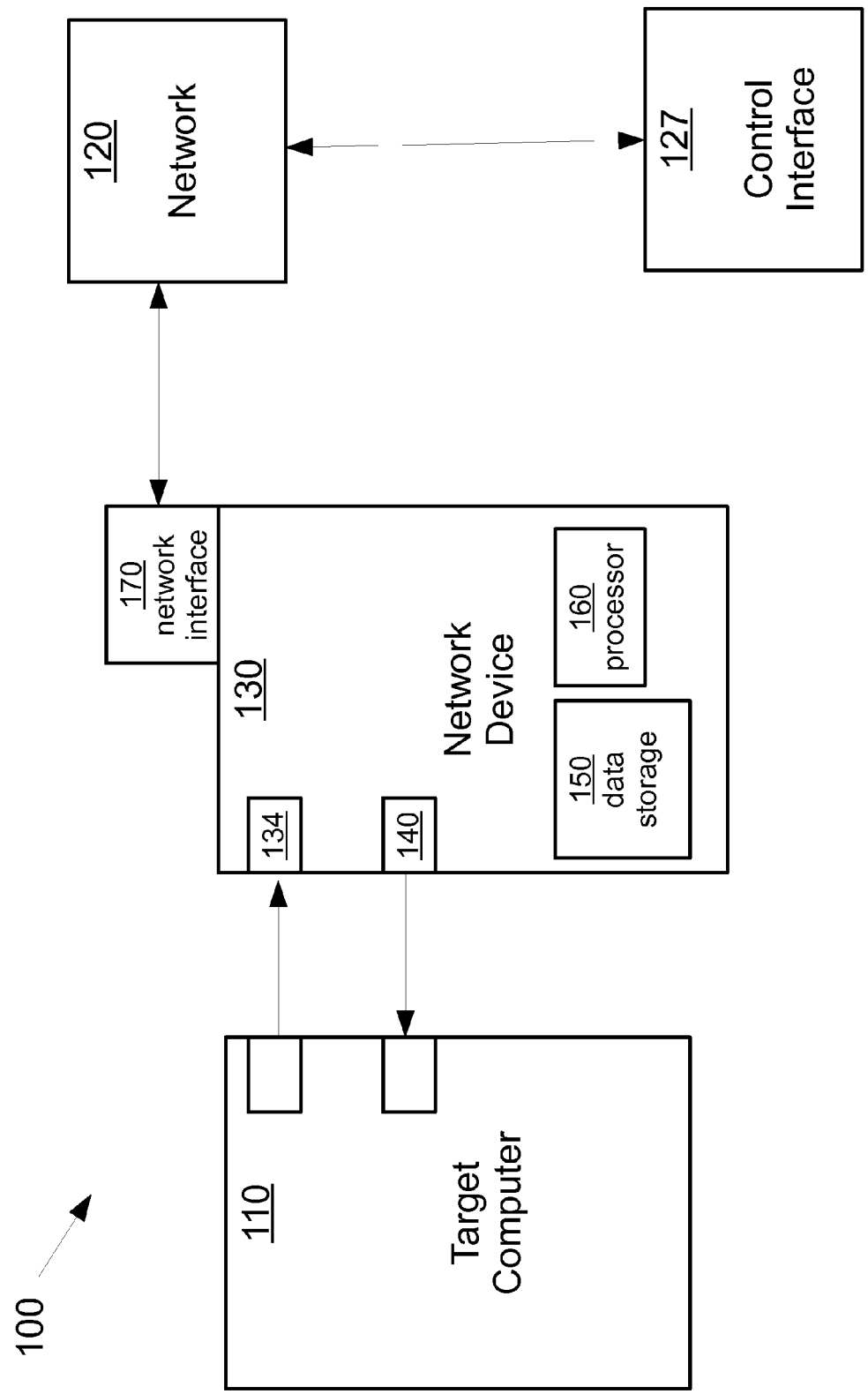
FIG. 1 is an object diagram of a first embodiment network device.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 shows remote computer control system 100 in which network device 130 is mediating the control of target computer 110 through remote computer control interface 127. As shown in FIG. 1, network device 130 has the major components of: processor 160, interface for emulating a human interface device 140, video input 134, data storage 150 for storing data from target device 110 or transferring data to said target device, first network interface 170. Processor 160 is a CPU, microprocessor, APU, ASIC, programmable logic device, or other similar device. The interface for emulating a human interface device may be a USB port, PS/2 mouse or keyboard port, or other similar interface. Video input 134 is a RGB port, HDMI port, or other similar video port. Target device 110 is a desktop computer, notebook computer, or other similar computer. First network interface 170 is an Ethernet port connected to the Internet 120, a cellular modem, or some other similar network connection. The network device is generally configured to provide control of the target device through the interface for emulating a human interface device.

Before using network device 130, it is attached to target computer 110. The video output from target computer 110, which is typically connected to a monitor associated with target computer 110, is connected to video input 134. Next, human interface device interface 140 is connected to target computer 110. More specifically, target computer 110's mouse and keyboard are disconnected from target computer 110, and cables from interface 140 are connected to target computer 110's mouse and keyboard port. Ideally, the human interface device ports are all USB ports.

Network device 130 is then connected to the Internet 120. If network interface 170 is an Ethernet port, it is merely connected to an Ethernet Internet connection available at target computer 110's location. If network interface is a cellular modem, an Internet connection is made wirelessly to a cellular data provider.

Network device 130 then makes connection to remote computer control interface 127. Remote computer control interface may be a server computer at a dedicated IP address which network device transmits data packets to in order to inform control interface 127 that network device is ready to provide control of target computer 110. A user at control interface 127 then initiates control of target computer 110. More specifically, if target computer 110 is off, a user will power on target computer 110. The video display signal generated by target computer 110 is then received over video port 134. This video signal is transmitted by network device 130 over network interface 170 to control interface 127. A user at control interface 127 views the video display signal generated by target computer 110. The user at control interface 127 then manipulates a keyboard, mouse, or other human interface device at his location with the intent of controlling target computer 110. These manipulations are captured by control interface 127 and transmitted over the Internet to network device 130. Network device 130 then relays these commands to target computer 110 over interface 140. Target 110 receives the keyboard and mouse controls, and is thus remotely manipulated. As target computer 110's video display output changes, these changes are continually relayed by network device 130 to remote computer control interface 127. Similarly, the keyboard and mouse actions from the user at control interface 127 are continually relayed to target computer 110 through network device 130.

The user at control interface 127 may cause data to be transferred from target computer 110 to network device data storage 150. For example, important documents and user files may be backed up from target computer 110 to data storage 150. This data transfer may be done by having network device 130 emulated a USB hard drive over interface 140. Similarly, data may be transferred from data storage 150 onto target computer 110. For example, it may be desirable to transfer application software for installation to target computer 110.

Figure 2:
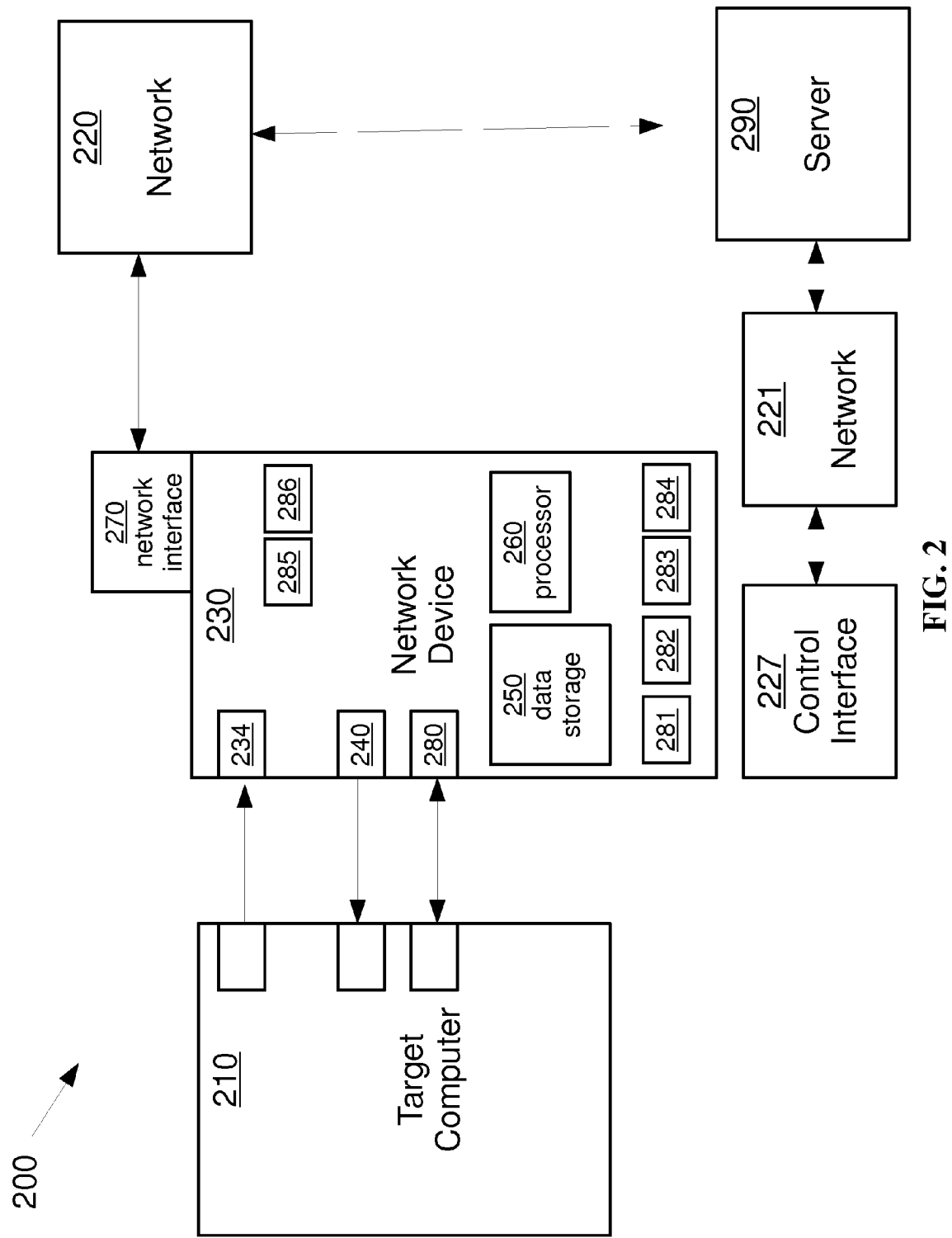
FIG. 2 is an object diagram of a second embodiment network device.
Figure 3:
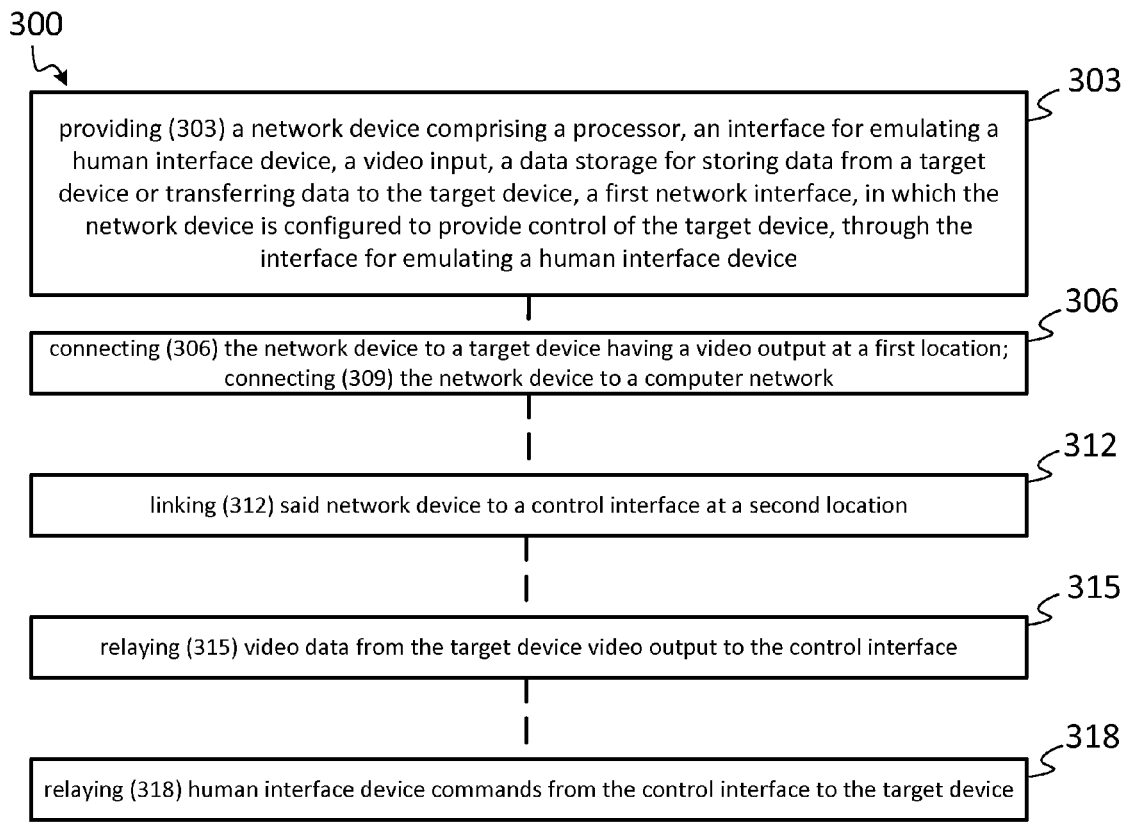
FIG. 3 is a flow chart of a third embodiment method of providing remote support with a network device.
Figure 4:
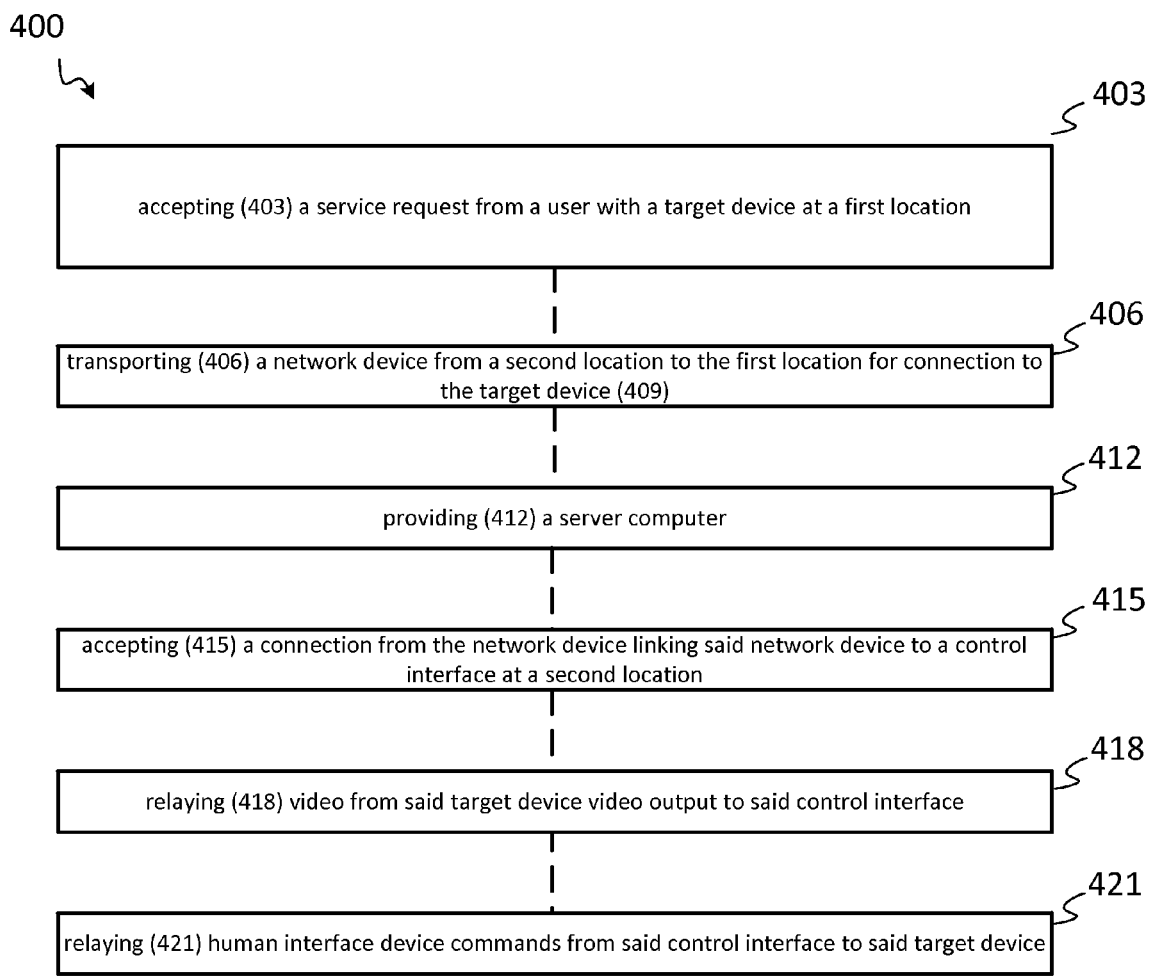
FIG. 4 is a flow chart of a fourth embodiment method of providing remote support with a network device.

FIG. 2 shows remote computer control system 200 with network device 230 relaying control of target computer 210 to remote computer interface 227. Network device 230's construction and operation is similar to network device 130, but has some added components and functionality. More specifically, as shown in FIG. 2, network device 230 has all the components of network device 130 and further includes second network interface 280, speaker 281, video display 282, touchpad 283, touchscreen 284, video camera 285, and battery 286. Network interface 280 is a Ethernet interface for providing network access to Target computer 210. Speaker 281 allows a user at remote computer control interface 227 to send voice audio instructions to users at target computer 210's location. Additionally, speaker 281 can be connected to the audio output of target computer 210. Video display 282 is used to display directions and instructions to a user at target computer 210's locations. Such video instructions may originate from data storage 250, or from a user at control interface 227. Touchpad 283 and touchscreen 284 act as a user interface to network device 230. Video camera 285 is used to relay video camera data to remate user at control interface 227. Such video data is useful for allowing the remote user to see how data cables are attached to target computer 210. Battery 286 allows network device to work without needing a power outlet to aid in mobility of the network device during usage with target computer 210, and to allow network device to work independently of target computer 210.

Additionally, system 200 has server computer 290 which network device 230 makes initial contact with. Server 290 can then connect one of a number of different remote users to target computer 210. This ability is useful when a number of different remote computer technicians with different ability or availability exist, which can alternatively be connected to help repair target computer 210. Additionally, it allows different remote technicians to be located in different geographies.

Network devices 130 and 230 may be part of a remote computer repair service in which the network device is transported to the target computer's location in response to a service request. More specifically, a user in need of repairing target computer 210 may call a phone number requesting help from a service provider. In response, the service provider will mail network device 230 to the location of the user at target computer 210. Alternatively, the user may go to a service store to obtain network device 230 and bring it back to target computer 210.

Once network device 230 is received at target computer 210's location, a user turns on network device 230. Directions on how to connect network device 230 to target computer will then be displayed on display 282. A remote technician at control interface will help get target computer repaired using the remote control provided by network device 230, and by potentially using data storage 250 to reinstall software and backup data. When target computer 210 is repaired, the user then mails network device 230 back to the service provider (or alternatively physically returns network device to the service store where he/she obtained it). Return postage may be provided when network device 230 was originally mailed so that the user does not need to obtain postage.

While several embodiments of the device and method for remote computer operation has been shown and described, and several modifications thereof discussed, persons skilled in this art will readily appreciate that various additional changes may be made without departing from the scope of the invention.

The invention claimed is:

1. A network device for providing remote technical support with respect to a target device, the network device comprising:
    a processor,
    an interface for emulating a human interface device,
    a video input for receiving a video display signal from the target device,
    a data storage for storing data from the target device or transferring data to said target device, wherein said data storage includes software for installation on the target device,
    a first network interface configured to receive commands from a remote control interface the commands transmitted to the target device through the interface for emulating a human interface device,
    wherein said network device is configured to provide control of the target device, through said interface for emulating a human interface device.

2. The network device as set forth in claim 1, wherein said interface for emulating a human interface device includes emulation of a keyboard, mouse, touchpad, or trackpoint.

3. The network device as set forth in claim 1, wherein said interface for emulating a human interface device includes a USB interface.

4. The network device as set forth in claim 1, wherein said interface for emulating a human interface device includes a USB interface which can act as either a host or a peripheral.

5. The network device as set forth in claim 1, wherein said interface for emulating a human interface device includes emulation of hard drive or disk drive.

6. The network device as set forth in claim 1, wherein said network interface includes a wireless interface.

7. The network device as set forth in claim 1, wherein said device is configured to relay human interface device data received from said network interface over said interface for emulating a human interface device.

8. The network device as set forth in claim 1, wherein said data storage is configured to act as a peripheral storage device for said target device.

9. The network device as set forth set forth in claim 1, wherein said data storage includes software to be transferred to said target device.

10. The network device as set forth in claim 1 and further including a second network interface for connecting to said target device.

11. The network device as set forth in claim 1 and further including a speaker.

12. The network device as set forth in claim 1 and further including a touchscreen.

13. The network device as set forth in claim 1 and further including a video camera.

14. The network device as set forth in claim 1 and further including a battery.

15. A network device for providing remote technical support with respect to a target device, the network device comprising:
    a processor;
    an interface for emulating a human interface device;
    a video input for receiving a video display signal from the target device;
    a data storage for storing data from the target device or transferring data to the target device, wherein the data storage includes software for installation on the target device and software for providing network based control of the target device by a user;
    a first network interface configured to receive commands from a remote control interface, the commands transmitted to the target device through the interface for emulating a human interface device; and,
    wherein said network device is configured to provide control of the target device, through the interface for emulating a human interface device.

* * * * *